United States Patent [19]
Aufdermarsh, Jr.

[11] 3,933,677
[45] Jan. 20, 1976

[54] PREPARATION OF AQUEOUS DISPERSIONS OF BLOCKED AROMATIC POLYISOCYANATES

[75] Inventor: Carl Albert Aufdermarsh, Jr., Newark, Del.

[73] Assignee: E. I. Du Pont de Nemours & Company, Wilmington, Del.

[22] Filed: May 24, 1974

[21] Appl. No.: 473,160

[52] U.S. Cl.......... 252/188.3 R; 117/76 T; 117/76 F; 117/77; 117/138.8 F; 117/138.8 N; 117/139; 156/330; 156/331; 156/332; 156/335; 260/29.2 TN; 260/29.3; 260/77.5 TB; 260/471 C; 252/182
[51] Int. Cl.² .................. C09K 3/00; B23B 27/00; C08L 61/06; C07C 79/46
[58] Field of Search ............... 252/188.3 R, 182; 260/29.2 TN, 77.5 TB, 471 C, 29.3; 156/330, 331, 332, 335, 338

[56] References Cited
UNITED STATES PATENTS

| 3,226,276 | 12/1965 | Rye et al. | 260/77.5 TB |
| 3,234,067 | 2/1966 | Krysiak | 156/330 |
| 3,268,467 | 8/1966 | Rye et al. | 260/77.5 TB |
| 3,278,333 | 10/1966 | Titzmann et al. | 260/29.3 |
| 3,438,922 | 4/1969 | Ueno et al. | 260/29.2 TN |
| 3,454,621 | 7/1969 | Engel, Jr. | 260/471 C |
| 3,489,744 | 1/1970 | Schwarcz et al. | 260/188.3 R |
| 3,668,186 | 6/1972 | Duncan et al. | 260/77.5 TB |

Primary Examiner—Benjamin R. Padgett
Assistant Examiner—T. S. Gron

[57] ABSTRACT

Aqueous dispersions of aromatic polyisocyanates blocked with phenolic compounds are prepared by mixing the polyisocyanate dissolved in an organic water-soluble solvent and an aqueous solution containing an excess of the phenolic compound in the presence of an alkali metal hydroxide catalyst. When the phenolic compound is resorcinol, the excess resorcinol in the dispersion may be reacted with formaldehyde to form a resorcinol-formaldehyde resin; when the phenolic compound is phenol, excess resorcinol may be added and formaldehyde reacted with it to form the resorcinol-formaldehyde resin, a polyepoxide and a rubber latex may be also dispersed thus forming a dispersion that may be used to form single dip adhesive coatings on polyester substrates which will adhere to rubber.

7 Claims, No Drawings

PREPARATION OF AQUEOUS DISPERSIONS OF BLOCKED AROMATIC POLYISOCYANATES

SUMMARY OF THE INVENTION

This invention relates to a process for the preparation of aqueous dispersions of aromatic polyisocyanates blocked with phenolic compounds and to the preparation of a dispersion suitable for use in the formation of a single dip coating on polyester substrates which cause the polyester to adhere to rubber. Specifically, the single dip coating has utility as a coating for polyester tire cord.

BACKGROUND

It is known in the art to coat polyester substrates with phenol-blocked aromatic polyisocyanates from a single dip adhesive solution which also contains a polyepoxide and a rubber latex — U.S. Pat. No. 3,234,067. The present invention produces an adhesive of this type, by a simplified procedure. The adhesive differs from that of the U.S. Pat. No. 3,234,067 in that somewhat better adhesion is obtained. Chemically the products differ in that the dip compositions of the present invention require the presence of alkali metal hydroxide, while the compositions of U.S. Pat. No. 3,234,067 exclude the presence of excess caustic.

DETAILED DESCRIPTION OF THE INVENTION

The present invention comprises a process for the preparation of an aqueous dispersion of a phenolic-compound-blocked aromatic polyisocyanate. This aqueous dispersion is obtained by intimately mixing an aromatic polyisocyanate dissolved in a water-soluble organic solvent that is nonreactive with the polyisocyanate and an aqueous solution of a phenolic compound in the presence of a catalytic amount of an alkali metal hydroxide at a temperature of from 25° to 75°C. The reaction rate is temperature dependent, and will be substantially complete in from 10 to 120 minutes. Normally the dispersion will contain 1 to 25% by weight of the dispersion of blocked aromatic polyisocyanate. In the preferred process the solution of the polyisocyanate is added to the solution of the phenolic compound.

The number of moles of the phenolic compound employed should be at least equal to the number of equivalents of isocyanate groups present, and the number of moles of phenolic compound may be as much as 8 times the number of equivalents of isocyanate groups. The preferred range of moles of phenolic compound per equivalent isocyanate group is about 1.1 to about 5.

The amount of alkali metal hydroxide employed as catalyst in the reaction is about 0.05 to 1 wt. percent based on the amount of water present. Any alkali metal hydroxide may be employed, but sodium hydroxide is preferred.

The phenolic compound employed as the blocking agent can be phenol or resorcinol.

Aromatic polyisocyanates are a well known class of compounds, and any of these compounds may be used herein, but the preferred compounds are diphenylmethane -4,4'-diisocyanate, toluene-2,4-diisocyanate, benzene-1,3-diisocyanate, diphenylether-2,4,4'-triisocyanate, and triphenylmethane-4,4',4''-triisocyanate. Diphenylmethane-4,4'-diisocyanate is the most preferred compound.

It is desirable when carrying out the blocking reaction to have present in the mixture a water soluble surfactant. Preferred surfactants are anionic. A suitable surfactant is sodium dioctylsulfosuccinate. The surfactant can be present in the reaction mixture in the amount of about 1–10% by weight of the blocked isocyanate.

Solvents for dissolving the polyisocyanate must be nonreactive with the isocyanate and must be water soluble. Methyl ethyl ketone, acetone and tetrahydrofuran are highly satisfactory.

The present invention also comprises forming a coating solution that may be used as a single dip coating on polyester substrates. The first step in forming this coating is the removal of the water-soluble organic solvent. This may be accomplished by distillation. The distillation is preferably carried out at reduced pressure. After the solvent is removed a soluble formaldehyde-resorcinol resin is formed in the dispersion. If the phenolic compound employed in the formation of the dispersion is resorcinol, an aqueous solution of formaldehyde is merely added with mixing to the dispersion; a resorcinol-formaldehyde resin thus directly forms as the resorcinol was added in excess of that needed to block the isocyanate. On the other hand, if phenol is employed in blocking the isocyanate, then an amount of resorcinol is first added to the dispersion such that in the final dispersion the weight ratio of resorcinolformaldehyde resin to blocked aromatic polyisocyanate is in the range of about 0.2 to 1 to about 1.5 to 1.

The formation of the resorcinol-formaldehyde resin in the dispersion of blocked isocyanate takes place on the addition of formaldehyde to the dispersion containing the resorcinol. This reaction is best carried out at a temperature in the range of about 25° to 50°C. The resorcinol is preferably present in a small molar excess over the amount of formaldehyde present.

The final coating solution must also contain a water insoluble polyepoxide and a rubber latex. These components are merely added in accordance with the conventional practices of the art as illustrated by U.S. Pat. No. 3,234,067. The weight ratio of polyepoxide present in the dispersion to amount of blocked isocyanate present should be about 0.1 to 1 to about 4 to 1. The amount of rubber latex solids present in the dispersion should be from about equal to the amount of resorcinol-formaldehyde resin present to about 6 times the amount of resorcinol-formaldehyde resin present.

The coating solution will contain about 6 to 24% by weight total solids. It may be applied in the conventional manner to the polyester substrate. After application the coating is heated to above about 200°C. for 0.5 to 15 minutes to remove the water and cure the coating. Usually the polyester substrate is kept under tension to prevent shrinkage. Thereafter rubber is applied and cured.

The single dip coating composition contains about 0.01 to 1 wt. percent alkali metal hydroxide, based on the weight of the water present. In the following examples the adhesion of polyester substrate to rubber is tested by the single end strip adhesion test and the "H-pull" test. Both of these tests are well known in the art and are more fully described in columns 2 and 3 of U.S. Pat. No. 3,234,067.

The term "polyepoxide" is well defined in the art of adhesion coating of polyester resins, and is used herein in its convention sense. The term is more fully defined in U.S. Pat. No. 3,234,067 at column 9, line 12 et seq. The preferred polyepoxides are those having on the average at least 2 epoxy groups per molecule, a melting point above about 90°C. and an average molecular weight of above 800 and an epoxide equivalent above 200.

The term "rubber latex" is well known in the art of making resorcinol-formaldehyde-latex (RFL) coatings, and is used herein in the conventional sense. Suitable latex can be made from vinylpyridine copolymers; a preferred latex is 1,3-butadiene/styrene/2-vinylpyridine (70/15/15).

The coating composition of this invention is especially useful to coat polyester substrates, such as polyethylene terephthalate and the like, but it may also be used to coat cotton, rayon, nylon, and other fibrous materials that are to be used to reinforce rubber articles.

In the examples which follow, all parts and percentages are in parts by weight and all temperatures are in degrees centigrade unless otherwise specified.

EXAMPLE 1

1. Preparation of resorcinol blocked diphenylmethane-4,4'-diisocyanate dispersion A A 5-liter round-bottom flask was equipped with a mechanical agitator, reflux condenser, thermometer, heating mantle and 500 ml dropping funnel. Two liters of water were charged into the flask, and the following substances were dissolved therein: 413 g. resorcinol, 3.0 g. sodium hydroxide pellets and 23 gm. sodium dioctylsulfosuccinate (sold as Aerosol OT by American Cyanamid). The solution was heated to 40°C. and agitated vigorously.

A solution of 200 g. diphenylmethane-4,4'-diisocyanate in 200 ml. methyl ethyl ketone was added from the dropping funnel over a period of one minute. During the next 8 minutes the temperature rose to 49.5°C., and the blocked isocyanate separated in finely dispersed form. The mixture was stirred for one hour at ambient temperature.

2. Removal of methyl ethyl ketone from dispersion A

The dispersion of step 1 was placed in a flask equipped with a distillation head, condenser and receiver. Pressure was reduced to about 175 mm. Hg., and the pot temperature slowly raised to about 62°C. A total of about 200 ml. ketone and 200 ml. water was collected in the receiver.

3. Preparation of resorcinol-formaldehyde resin containing dispersion A

The product of step 2 was cooled to 28°C., 156 gm. of 37% aqueous formaldehyde solution was added, and the mixture stirred for 1 hour.

4. Preparation of dispersion-A/resins slurry

To the product of step 3 was added 100 gm. of micronized epoxy cresol novolac resin (sold as ECN-1299 by Ciba-Geigy) and the mixture stirred vigorously for one hour.

The mixture was then charged into a 1 gallon ball-mill containing 3/4-inch "Burundum" cylinders and rolled for 70 hours.

5. Preparation of single dip coating composition, substrate coating and testing The slurry of step 4 (50 gm.) was diluted with 92.1 gm. water and then 29.3 gm. of a 41 wt. % 1,3-butadiene/styrene/2-vinylpyridine latex (sold as "Gen-Tac" by General Tire and Rubber Co.) was added with moderate agitation. The adhesive contained about 15% solids and was applied to the cord without aging.

Polyester cord was dipped in the above adhesive and treated on a Litzler machine under the following conditions:

|  | Oven 1 | Oven 2 |
|---|---|---|
| Temperature (°F.) | 450 | 450 |
| Applied Stretch (%) | 3 | 0 |
| Time (sec.) | 50 | 80 |

The cord was then tested in a rubber stock of the following composition:

| Component | Parts by Weight |
|---|---|
| Natural Rubber (smoked sheet No. 1) | 50 |
| SBR-1500[a] | 50 |
| HAF carbon black[b] | 35 |
| Stearic acid | 1 |
| Zinc oxide | 3 |
| Petroleum oil[c] | 9.37 |
| Antioxidant[d] | 1 |
| 2,2'-Dithiobisbenzothiazole | 1 |
| Sulfur[e] | 3.13 |

[a]Non-pigmented sulfur curable elastomer made by copolymerizing 1,3-butadiene and styrene at 6°C. continuously in a continuous water phase using emulsifiers, viscosity regulators, and a redox catalyst system. It contains about 23.5% styrene by weight and has a Mooney viscosity (ML-1 + 4/100°C.) of 52.
[b]ASTM Designation N-330.
[c]Naphthenic petroleum oil ASTM D-2226 Type 103 having Saybolt Universal Viscosity values of 2525 and 87.2 at 100°F. and 210°F., respectively, a molecular weight of 395, and a viscosity-gravity constant of 0.889. (Sun Oil's tradename for this oil is "Circosol 4240.)
[d]Polymerized 2,2,4-trimethyl-1,2-dihydroquinoline, m.p. 74°C. (Monsanto's tradename for this material is "Age Rite Resin D".)
[e]Amorphous, insoluble sulfur with 20% oil. (Stauffer Chemical's registered trademark for this composition is "Crystex".)

The adhesion values found were:

| 2 ply adhesion at 140°C. | 61 lbs./lineal inch (mostly rubber stock tear) |
|---|---|
| H-pull | 41 lbs./end |

COMPARATIVE EXAMPLE

Samples as above were prepared using the procedure described in U.S. Pat. No. 3,234,067, example 1(a), except that epoxy cresol novolac resin (sold as ECN-1299 by Ciba-Geigy) was used instead of the epoxylated novolac resin of the example. The results were:

| 2 ply adhesion at 140°C. | 31 lbs./lineal inch (mostly adhesive failure) |
|---|---|
| H-pull | 27 lbs./end |

EXAMPLE 2

Steps 1 to 4 of Example 1 were repeated using 138 gm. of 37% aqueous formaldehyde in step 3. An adhesive dip was then prepared having the following composition:
50 gm. of dispersion-A/resins slurry
90.9 gm. water
28.7 gm. "Gen-Tac" latex
Cords were then coated and tested as described in Example 1, and the results were:

| 2 ply adhesion at | 58 lbs./lineal inch |
| 140°C. | (stock tear) |
| H-pull | 40 lbs./end |

EXAMPLE 3

The procedure of Example 1, section 1 was repeated using the following quantities of chemicals: A solution of:

265 gm. phenol
1100 ml. water
4 gm. sodium hydroxide pellets 23 gm. Aerosol OT

A solution of:

150 gm. diphenylmethane-4,4'-diisocyanate
150 ml. methyl ethyl ketone.

The dispersion was vacuum filtered and the filter cake washed with water. After drying in a vacuum desiccator at 70°C. the cake weighed 251 g. The sample was determined to be phenol blocked diphenylmethane-4,4'-diisocyanate by comparing its melting point (197°–199°C.) and infra-red spectrum with a known sample of phenol blocked diphenylmethane-4,4'-diisocyanate.

Alternatives

It is contemplated that water-soluble derivatives of phenol or resorcinol, such as 2-chlorophenol, 3-chlorophenol, 4-chlorophenol, ortho-cresol, meta-cresol, par-acresol, or 1,3-dihydroxy-2-methylbenzene could be used in the described reactions and results similar to those shown would be obtained.

I claim:

1. A process for the production of an aqueous dispersion of an aromatic polyisocyanate blocked with a phenolic compound which comprises mixing (a) an aromatic polyisocyanate dissolved in a water-soluble organic solvent that is nonreactive with the aromatic polyisocyanate, and (b) an aqueous solution containing a dissolved phenolic compound selected from the class consisting of phenol and resorcinol, the number of moles of the phenolic compound being at least equal to the number of equivalents of isocyanate groups present, said mixing taking place in the presence of a catalytic amount of an alkali metal hydroxide at a temperature of 25° to 75°C.

2. The process of claim 1 in which the mixing takes place for between 10 and 120 minutes, and the dispersion contains 1 to 25% by weight of the dispersion of blocked aromatic polyisocyanate.

3. The process of claim 1 in which the catalytic amount of alkali metal hydroxide is 0.05 to 1.0 wt. percent based on the amount of water present.

4. The process of claim 1 in which a water soluble anionic surfactant is present during the mixing in the amount of 1–10 wt. % based on the amount of blocked isocyanate prepared.

5. The process of claim 1 which comprises the additional step of removing the organic solvent by distillation.

6. The process of claim 1 in which the aromatic polyisocyanate is selected from the class consisting of diphenylmethane-4,4'-diisocyanate, toluene-2,4-diisocyanate, benzene-1,3-diisocyanate, diphenylether-2,4,4'-triisocyanate, and triphenylmethane-4,4'-4''-triisocyanate.

7. The process of claim 6 in which the organic solvent is selected from the class consisting of acetone, methyl ethyl ketone and tetrahydrofuran.

* * * * *